US010065317B2

(12) United States Patent
Tan et al.

(10) Patent No.: US 10,065,317 B2
(45) Date of Patent: Sep. 4, 2018

(54) CONTROL SYSTEM FOR COORDINATING ROBOTIC MACHINES TO COLLABORATE ON TASKS

(71) Applicant: General Electric Company, Schenectady, NY (US)

(72) Inventors: Huan Tan, Niskayuna, NY (US); John Michael Lizzi, Wilton, NY (US); Charles Burton Theurer, Alplaus, NY (US); Balajee Kannan, Niskayuna, NY (US); Romano Patrick, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 252 days.

(21) Appl. No.: 15/198,673

(22) Filed: Jun. 30, 2016

(65) Prior Publication Data
US 2018/0001476 A1 Jan. 4, 2018

(51) Int. Cl.
*G05B 19/418* (2006.01)
*B25J 9/16* (2006.01)
*B61G 7/04* (2006.01)

(52) U.S. Cl.
CPC .............. *B25J 9/1682* (2013.01); *B61G 7/04* (2013.01); *B25J 9/16* (2013.01); *B25J 9/1666* (2013.01)

(58) Field of Classification Search
CPC . B25J 9/16; B25J 9/1682; B25J 9/0084; B25J 9/1666; B61G 7/04; G06T 70/70; G08G 21/18
See application file for complete search history.

(56) References Cited

U.S. PATENT DOCUMENTS 7,558,646 B2 7/2009 Matsumoto et al.
7,974,738 B2 7/2011 Bruemmer et al.
(Continued)

FOREIGN PATENT DOCUMENTS

CN 103350708 B 8/2015
WO 2015074841 A1 5/2015

OTHER PUBLICATIONS

Giannetti et al., "Collaboration among Members of a Team: a Heuristic Strategy for Multi-Robot Exploration", 2006 14th Mediterranean Conference on Control and Automation, pp. 1-6, Jun. 28-30, 2006, Ancona.
(Continued)

*Primary Examiner* — Rachid Bendidi
(74) *Attorney, Agent, or Firm* — GE Global Patent Operation; Pabitra Chakrabarti

(57) ABSTRACT

A system includes first and second robotic machines and a task manager. The first and second robotic machines have respective first and second sets of capabilities for interacting with a surrounding environment. The task manager selects the first and second robotic machines from a group to perform a task based on the first and second sets of capabilities of the robotic machines. The task involves manipulating and/or inspecting a target object of a vehicle. The task manager assigns a first sequence of sub-tasks to be performed by the first robotic machine and a second sequence of sub-tasks to be performed by the second robotic machine. The first and second robotic machines are configured to coordinate performance of the first sequence of sub-tasks by the first robotic machine with performance of the second sequence of sub-tasks by the second robotic machine to accomplish the task.

19 Claims, 7 Drawing Sheets

(56) References Cited

U.S. PATENT DOCUMENTS

| | | | |
|---|---|---|---|
| 8,583,313 B2 * | 11/2013 | Mian | G05D 1/0229 |
| | | | 700/245 |
| 9,026,248 B1 * | 5/2015 | Hickman | B25J 3/00 |
| | | | 700/246 |
| 9,085,080 B2 | 7/2015 | Mian | |
| 9,799,198 B2 * | 10/2017 | Tan | G08B 21/18 |
| 9,902,071 B2 * | 2/2018 | Tan | G06T 7/70 |
| 2014/0163730 A1 * | 6/2014 | Mian | B25J 9/16 |
| | | | 700/248 |
| 2015/0321350 A1 * | 11/2015 | Mian | B25J 9/16 |
| | | | 700/257 |
| 2016/0059416 A1 * | 3/2016 | Tian | B25J 9/1666 |
| | | | 700/253 |
| 2016/0354923 A1 * | 12/2016 | Kuffner, Jr. | B25J 9/0084 |

OTHER PUBLICATIONS

Xiao et al., "Surveillance and Tracking System with Collaboration of Robots, Sensor Nodes, and RFID Tags", Computer Communications and Networks, 2009. ICCCN 2009. Proceedings of 18th Internatonal Conference on, vol. 51, Issue: 9, pp. 1-6, Aug. 3-6, 2009, San Francisco, CA.

* cited by examiner

CONTROL SYSTEM FOR COORDINATING ROBOTIC MACHINES TO COLLABORATE ON TASKS

FIELD

The subject matter described herein relates to systems that control robotic machines to perform vehicle tasks, such as actuating a brake lever on a vehicle to release air brakes of the vehicle.

BACKGROUND

Some vehicles include brake systems that operate based on pressure differentials in fluid disposed in the brake systems. For example, air brakes in some vehicles (e.g., rail vehicles) may disengage when the air pressure in the air brakes is decreased. The air brakes in such vehicles may be released in certain environments in order to perform operations on the vehicles. The air brakes in rail vehicles, for example, may be disengaged while in a rail yard in order to more freely roll the rail vehicles around within the rail yard. In order to disengage the air brakes of vehicles, a human operator may pull on a lever that opens a valve of the air brakes. The valve is opened and the air within the brake system is bled (e.g., the air flows out of the brake system) to reduce the pressure within the brake system and disengage the air brakes. In addition to bleeding air brakes, human operators may also perform other tasks on vehicles in rail yards, such as setting and releasing hand brakes on the vehicles, connecting and disconnecting air hoses between two adjacent vehicles, inspecting the vehicles, and the like.

Use of human operators in a rail yard, however, is not without problems. The operations taking place in a rail yard pose safety risks to the human operators. Additionally, the use of human operators can involve increased cost relative to automated systems. For example, some trains include hundreds of vehicles coupled together that span a distance longer than a mile. An automated system may be able to move along the train from vehicle to vehicle to perform various tasks quicker and/or in a more cost efficient manner than a human operator.

But, automated systems pose problems as well. Although applicant is unaware of any automated system that can bleed air brakes of a vehicle, such an automated system that pulls on a brake lever to disengage a brake system may be unreliable due to the wide variances in the brake systems among several different vehicles. For example, different vehicles may have brake levers in different locations that may be difficult for the automated system to locate or access, may have brake levers that require different amounts of force to actuate, may have other components that block movement of the automated system when attempting to access and pull the brake lever, may have brake levers that become temporarily stuck, etc. These variances can make it difficult for an automated system to perform brake bleeding operations and other tasks on vehicles.

BRIEF DESCRIPTION

In an embodiment, a system (e.g., a control system) is provided that includes a first robotic machine, a second robotic machine, and a task manager. The first robotic machine has a first set of capabilities for interacting with a surrounding environment. The second robotic machine has a second set of capabilities for interacting with the surrounding environment. The task manager has one or more processors. The task manager is configured to select the first and second robotic machines from a group of robotic machines to perform a task that involves at least one of manipulating or inspecting a target object of a vehicle that is separate from the first and second robotic machines. The task manager is configured to select the first and second robotic machines to perform the task based on the first and second sets of capabilities of the respective first and second robotic machines. The task manager assigns a first sequence of sub-tasks to the first robotic machine for performance by the first robotic machine and a second sequence of sub-tasks to the second robotic machine for performance by the second robotic machine. The first and second robotic machines are configured to coordinate performance of the first sequence of sub-tasks by the first robotic machine with performance of the second sequence of sub-tasks by the second robotic machine to accomplish the task.

In an embodiment, a system (e.g., a control system) is provided that includes a first robotic machine and a second robotic machine. The first robotic machine has a first set of capabilities for interacting with a surrounding environment. The first robotic machine is configured to receive a first sequence of sub-tasks related to the first set of capabilities of the first robotic machine. The second robotic machine has a second set of capabilities for interacting with the surrounding environment. The second robotic machine is configured to receive a second sequence of sub-tasks related to the second set of capabilities of the second robotic machine. The first and second robotic machines are configured to perform the first and second sequences of sub-tasks, respectively, to accomplish a task that involves at least one of manipulating or inspecting a target object of a vehicle that is separate from the first and second robotic machines. The first and second robotic machines are configured to coordinate performance of the first sequence of sub-tasks by the first robotic machine with performance of the second sequence of sub-tasks by the second robotic machine.

In another embodiment, a system (e.g., a control system) is provided including a first robotic machine that has a set of capabilities for interacting with a surrounding environment. The first robotic machine has a communication circuit configured to receive a first sequence of sub-tasks for performing a task that involves at least one of manipulating or inspecting a target object of a vehicle that is separate from the first robotic machine. The first sequence of sub-tasks is related to the set of capabilities of the first robotic machine. The first robotic machine is configured to perform the first sequence of sub-tasks. The first robotic machine is further configured to communicate with a second robotic machine during the performance of the first sequence of sub-tasks. The second robotic machine is separate from the vehicle and configured to perform a second sequence of sub-tasks for performing the task. Completion of both the first and second sequences of sub-tasks accomplishes the task.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
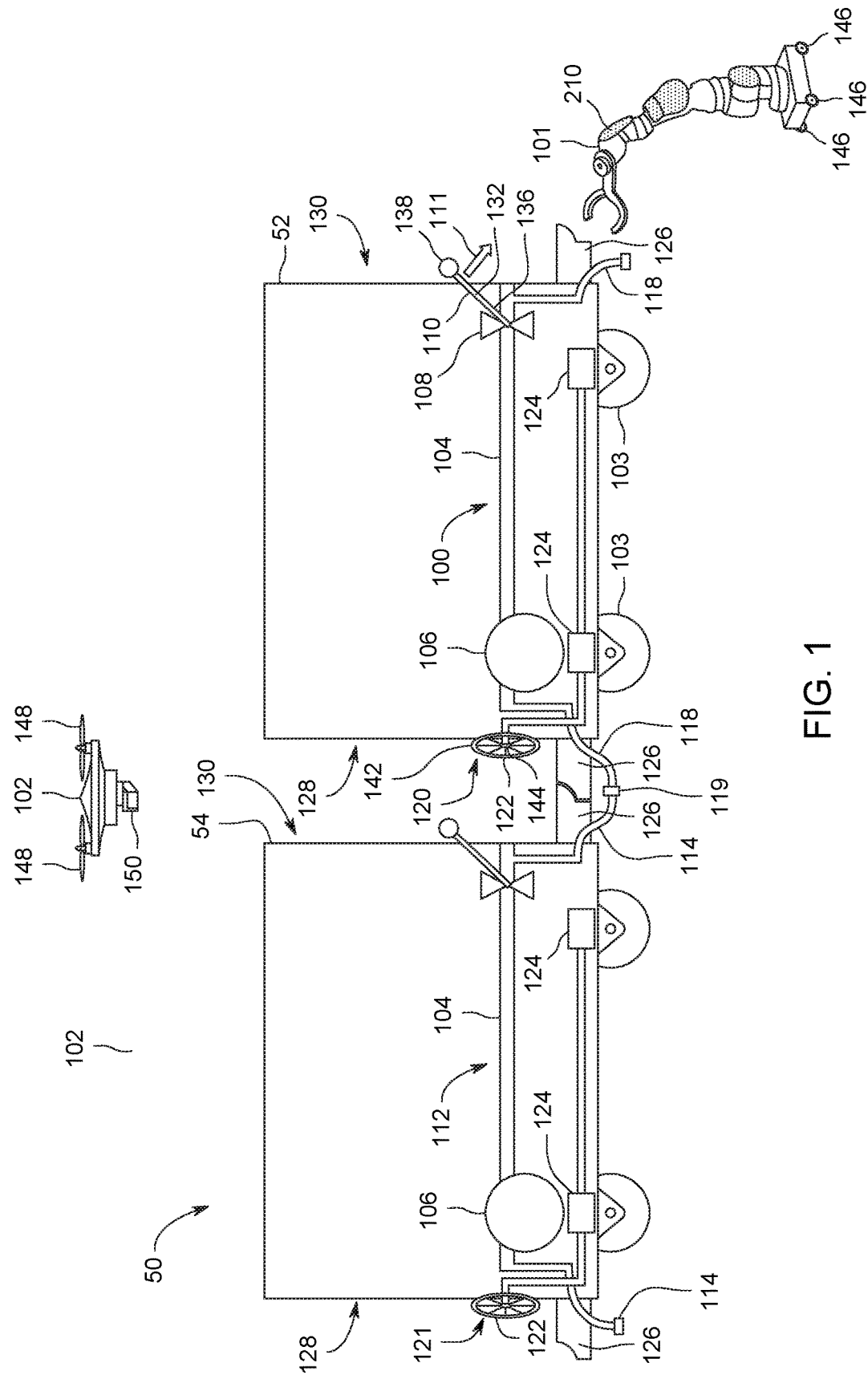
FIG. 1 schematically illustrates a vehicle system, a first robotic machine, and a second robotic machine according to one embodiment.

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicles such as rail cars, trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles.

The systems described herein can be used to perform an assigned task on a vehicle using multiple automated robotic machines that collaborate to accomplish the assigned task. The assigned task may involve at least one of the robotic machine assemblies approaching, engaging, and manipulating (e.g., moving) a target object on the vehicle. In one embodiment, the assigned task may be to release air from an automated air brake system on a vehicle, such as a rail car. The task may be referred to herein as brake bleeding. For example, a first robotic machine may perform at least a portion of the assigned task by grasping a brake lever and pulling the brake lever with a specific force (e.g., torque) in a specific direction and for a specific distance, before releasing the brake lever or returning the brake lever to a starting position. A second robotic machine may collaborate with the first robotic machine in the performance of the assigned task by at least one of inspecting a position of the brake lever on the vehicle, carrying the first robotic machine to the vehicle, lifting the first robotic machine toward the brake lever, verifying that the brakes are successfully bled, or the like. Thus, the multiple robotic machines work together to perform the assigned task. Each robotic machine performs at least one sub-task, and the assigned task is completed upon the robotic machines completing the sub-tasks. In order to collaborate successfully, the robotic machines communicate with each other. The robotic machines may be configured to perform the same or similar tasks on multiple vehicles in a vehicle system, such as a train. The robotic machines may also be used to perform the same or similar tasks on different types of vehicles and/or on different vehicle systems, such as on different trains in a railyard. Although two robotic machines are described in the example above, more than two robotic machines may collaborate with each other to perform an assigned task in another embodiment. For example, one robotic machine may fly along the vehicle to inspect a position of the brake lever, a second robotic machine may lift a third robotic machine to the brake lever, and the third robotic machine may grasp and manipulate the brake lever to bleed the brakes.

In one or more embodiments described herein, multiple robotic machines are controlled to work together (e.g., collaborate) to perform different tasks to vehicles. For example, in a rail yard, some tasks include brake bleeding, actuating (e.g., setting or releasing) hand brakes on rail vehicles, connecting air hoses between two adjacent rail vehicles (referred to herein as hose lacing), and the like. The robotic machines are automated, such that the tasks are performed autonomously without direct, immediate control of the robotic machines by a human operator as the robotic machines operate. The multiple robotic machines that collaborate with each other to perform an assigned task are not identical (e.g., like copies). The robotic machines have different capabilities or affordances relative to each other. The robotic machines are controlled to collaborate with each other to perform a given assigned task because the task cannot be completed by one of the robotic machines acting alone and/or the task can be completed by one of the robotic machines acting alone but not in a timely or cost-effective manner relative to multiple robotic machines acting together to accomplish the assigned task.

FIG. 1 schematically illustrates a vehicle system 50, a first robotic machine 101, and a second robotic machine 102 according to one embodiment. The vehicle system 50 includes a first vehicle 52 and a second vehicle 54 that are mechanically interconnected to travel together along a route. The second vehicle 54 is disposed in front of the first vehicle 52 in a direction of movement of the vehicle system 50. In an alternative embodiment, the vehicle system 50 may include more than two interconnected vehicles or only one vehicle. The first and second vehicles 52, 54 are rail vehicles in the illustrated embodiment, such as non-propulsion-generating rail cars, but may be other kinds of vehicles in other embodiments, such as automobiles, off-road vehicles, or the like. The first and second robotic machines 101, 102 are configured to perform an assigned task on one or both of the vehicles 52, 54 of the vehicle system 50. The first and second robotic machines 101, 102 collaborate (e.g., work together) to accomplish the assigned task. The first and second robotic machines 101, 102 perform various sub-tasks autonomously, without direct control and/or supervision of a human operator. For example, the robotic machines 101, 102 may act based on instructions received prior to beginning the sub-tasks. The assigned task is completed upon the completion of the sub-tasks by the robotic machines 101, 102.

The first vehicle 52 includes an air brake system 100 disposed onboard the vehicle 52. The air brake system 100 operates on a pressure differential within one or more conduits 104 of the air brake system 100. When the pressure of a fluid, such as air, in the conduits 104 is above a designated threshold or when the pressure increases by at least a designated amount, air brakes 106 of the brake system 100 engage corresponding wheels 103 of the vehicle 52. Although only one air brake 106 is shown in FIG. 1, the brake system 100 may include several air brakes 106 on the vehicle 52. The conduit 104 is connected with a valve 108 that closes to retain the fluid within the conduit 104. The valve 108 can be opened to release (e.g., bleed) the fluid out of the conduit 104 and the air brake system 100. Once the pressure of the fluid in the conduit 104 and air brake system 100 drops by or below a designated amount, the air brakes 106 of the brake system 100 release the wheels 103. The vehicle 52 may then freely roll with the air brakes 106 being disengaged.

The valve 108 can be actuated by manipulating (e.g., moving) a brake lever 110. The brake lever 110 can be pulled or pushed in a direction 111 to open and close the valve 108. In an embodiment, releasing the brake lever 110 may cause the valve 108 to close. For example, the brake lever 110 may move under the force of a spring or other biasing device to return to a starting position and force the valve 108 closed. In another embodiment, the brake lever 110 may require an operator or an automated system to return the brake lever 110 to the starting position to close the valve 108 after bleeding the air brake system 100.

The second vehicle 54 also includes an air brake system 112 that is identical, or at least substantially similar, to the air brake system 100 of the first vehicle 52. The second vehicle 54 includes a hose 114 (also referred to herein as air hose) that is fluidly connected to a conduit 104 of the air brake system 112. The first vehicle 52 also includes a hose 114 that is fluidly connected to the conduit 104. The hose 118 extends from a front 128 of the first vehicle 52, and the hose 114 extends from a rear 130 of the second vehicle 54. The hoses 114, 118 are configured to connect to each other at a separable interface 119 to provide a fluid path between the air brake system 100 of the first vehicle 52 and the air brake system 112 of the second vehicle 54. Fluid, such as air, may be allowed to flow between the air brake systems 100, 112 when the hoses 114, 118 are connected. Fluid cannot flow between the air brake systems 100, 112 when the hoses 114, 118 are disconnected. The first vehicle 52 has another air hose 118 at the rear end 130 thereof, and the second vehicle 54 has another air hose 114 at the front end 128 thereof.

The first vehicle 52 also includes a hand brake system 120 disposed onboard the vehicle 52. The hand brake system 120 includes a brake wheel 122 that is configured to be rotated manually by an operator or an automated machine. The brake wheel 122 is mechanically linked to hand brakes 124 (e.g., shoes or pads) on the vehicle 52. Rotation of the brake wheel 122 in a first direction causes the hand brakes 124 to move towards and engage the wheels 103, setting the hand brakes 124. Rotation of the brake wheel 122 in an opposite, second direction causes the hand brakes 124 to move away from and disengage the wheels 103, releasing the hand brakes 124. In an alternative embodiment, the hand brake system 120 includes a lever or another actuatable device instead of the brake wheel 122. In the illustrated embodiment, the second vehicle 54 includes a hand brake system 121 that is identical, or at least substantially similar, to the hand brake system 120 of the first vehicle 52, and will not be described in detail.

The first and second vehicles 52, 54 include mechanical couplers 126 at both the front ends 128 and the rear ends 130 of the vehicles 52, 54. The mechanical coupler 126 at the rear end 130 of the second vehicle 54 is mechanically engaged and connected to the mechanical coupler 126 at the front end 128 of the first vehicle 52 to interconnect or couple the vehicles 52, 54 to each other. The vehicle 52 may be uncoupled from the vehicle 54 by disconnecting the mechanical couplers 126 extending between the vehicles 52, 54.

The robotic machines 101, 102 are discrete from the vehicle system 50 (and the vehicles 52, 54 thereof) such that neither robotic machine 101, 102 is integrally connected to the vehicle system 50. The robotic machines 101, 102 are configured to move relative to the vehicle system 50 to interact with at least one of the vehicles 52, 54. Each of the robotic machines 101, 102 has a specific set of affordances or capabilities for interacting with the surrounding environment. Some examples of capabilities include flying, driving (or otherwise traversing along the ground), lifting other objects, imaging (e.g., generating images and/or videos of the surrounding environment), grasping an object, rotating, tilting, extending (or telescoping), retracting, pushing, pulling, or the like. The first robotic machine 101 has a first set of capabilities, and the second robotic machine 102 has a second set of capabilities.

In the illustrated embodiment, the first robotic machine 101 is different than the second robotic machine 102, and has at least some different capabilities than the first robotic machine 101. Thus, the second set of capabilities of the second robotic machine includes at least one capability that differs from the first set of capabilities of the first robotic machine or vice-versa. For example, the first robotic machine 101 in the illustrated embodiment has the capability to drive on the ground via the use of multiple wheels 146. The first robotic machine also has the capabilities to grasp and manipulate a target object 132 on a designated vehicle, such as the first vehicle 52, using a robotic arm 210. The robotic arm 210 may have the capabilities to rotate, tilt, lift, extend, retract, push, and/or pull the target object 132. The first robotic machine 101 is referred to herein as a grasping robotic machine 101. In the illustrated embodiment, the target object 132 is identified as the brake lever 110, but the target object 132 may be a different device on the vehicle 52 depending on the assigned task that is performed by the robotic machines 101, 102.

The second robotic machine 102 in the illustrated embodiment is an unmanned aerial vehicle (e.g., a drone) that has the capability to fly in the air above and/or along a side of the vehicle system 50, via the use of one or more propellers 148. Although not shown, the robotic machine 102 may include wings that provide lift. The second robotic machine 102 in FIG. 1 is referred to as an aerial robotic machine 102. The aerial robotic machine 102 includes an imaging device 150 that is configured to generate imaging data, such as still images and/or video, of the surrounding environment in the visual frequency range, the infrared frequency range, or the like. The imaging device 150 may be an infrared camera, a stereoscopic 2D or 3D camera, a digital video camera, or the like. Using the imaging device 150, the aerial robotic machine 102 has the capability to visually inspect a designated vehicle, including a target object thereof, such as to determine a position or status of the target object. The aerial robotic machine 102 does not have the capability to drive on the ground or grasp and manipulate a target object like the grasping robotic machine 101. The grasping robotic machine 101, on the other hand, does not have the capability to fly.

The robotic machines 101, 102 are configured to perform an assigned task on one or both of the vehicles 52, 54. For example, the robotic machines 101, 102 may perform the assigned task on the first vehicle 52, and then may subsequently perform the assigned task on the second vehicle 52. The vehicle system 50 may include more vehicles than the two vehicles 52, 54 shown in FIG. 1, and the robotic machines 101, 102 may be configured to move along the vehicle system 50 from vehicle to vehicle performing the assigned task. Alternatively, the robotic machines 101, 102 may perform the assigned task on the first vehicle 52 and not on the second vehicle 54, or vice-versa. The grasping and aerial robotic machines 101, 102 work together and collaborate to complete the assigned task. The assigned task involves at least one of the robotic machines 101, 102 engaging and manipulating the target object 132 on the designated vehicle. In the illustrated embodiment, the grasping robotic machine 101 is configured to engage and manipulate the brake lever 110 which defines the target object 132. The aerial robotic machine 102 is configured to fly above the vehicle system 50 and inspect the target object 132 using the imaging device 150. The aerial robotic machine 102 also may use the imaging device 150 to detect the presence of obstructions between the grasping robotic machine 101 and the target object 132.

The aerial robotic machine 102 and the grasping robotic machine 101 shown in FIG. 1 are merely intended as example robotic machines. The first and second robotic machines 101, 102 may have other shapes and/or capabilities or affordances in other embodiments, as shown and described herein. For example, the robotic machines 101, 102 in one or more other embodiments may both be land-based and/or may both have robotic arms 210 for grasping.

One assigned task may be for the robotic machines 101, 102 to bleed the air brake systems 100, 112 of the respective vehicles 52, 54 in the vehicle system 50. Prior to the vehicle system 50 starting to move from a stationary position, the air brake systems 100, 112 of each of the vehicles 52, 54 are bled to release the air brakes 106. The brake lever 110 defines the target object 132. The grasping and aerial robotic machines 101, 102 collaborate to perform the assigned task. For example, the aerial robotic machine 102 may fly above the first vehicle 52, locating and identifying the brake lever 110, and determining that the brake lever 110 is in a non-actuated position requiring manipulation to release the air brakes 106. The aerial robotic machine 102 informs the grasping robotic machine 101 of the location and/or status (e.g., non-actuated) of the target device 132. Since the grasping robotic machine 101 traverses on the ground, the robotic machine 101 is susceptible to obstructions blocking the path of the robotic machine 101. The aerial robotic machine 102 optionally may also inspect the path ahead of the grasping robotic machine 101 and notify the grasping robotic machine 101 of any detected obstacles between the robotic machine 101 and the brake lever 110. The grasping robotic machine 101 receives and processes the information transmitted from the aerial robotic machine 102. The grasping robotic machine 101 locates the brake lever 110, moves toward the brake lever 110, engages the brake lever 110, and manipulates the brake lever 110 by pulling or pushing the brake lever 110 to bleed the air brakes 106. The grasping robotic machine 101 and/or the aerial robotic machine 102 determine whether the brake lever 110 has been moved fully to the actuated position, opening the valve 108 to release the air brakes 106. Upon confirmation that the air brakes 106 are released, the grasping robotic machine 102 releases the brake lever 110 and moves to the next vehicle (e.g., the second vehicle 54) in the vehicle system 50 to repeat the brake bleeding task. Optionally, the robotic machines 101, 102 may implement one or more follow up actions responsive to determining that the air brake system 100 has or has not been released, such as by communicating with one or more human operators, attempting to release the air brake system 100 again, or identifying the vehicle 52 having the air brake system 100 that is not released as requiring inspection, maintenance, or repair.

The robotic machines 101, 102 may be configured to perform additional or different tasks other than brake bleeding. For example, the robotic machines 101, 102 may be assigned the task of setting and/or releasing the hand brakes 124 of one or both vehicles 52, 54. The hand brakes 124 may be set as a back-up to the air brakes 106. When the vehicle system 50 is stopped, human operators may decide to set the hand brakes on only some of the vehicles, such as the hand brakes on every fourth vehicle along the length of the vehicle system 50. One assigned task may be to release the hand brakes on the vehicles to allow the vehicle system 50 to move along the route. In an embodiment, the aerial robotic machine 102 may fly along the vehicle system 50 to detect which vehicles have hand brakes that need to be released. The aerial robotic machine 102 may inspect the hand brakes along the vehicles and/or the positions of the brake wheels to determine which vehicles need to have the hand brakes released. For example, the aerial robotic machine 102 may determine that the hand brakes 124 of the second vehicle 54 need to be released, but the hand brakes 124 of the first vehicle 52 are not set. The aerial robotic machine 102 notifies the grasping robotic machine 101 to actuate the brake wheel 122 of the second vehicle 54, but not the brake wheel 122 of the first vehicle 52. The aerial robotic machine 102 may also provide other information to the grasping robotic machine 101, such as the type and location of obstacles detected in the path of the grasping robotic machine 101.

Upon receiving the communication from the aerial robotic machine 102, the grasping robotic machine 101 may move past the first vehicle 52 to the front end 128 of the second vehicle 54. The grasping robotic machine 101 manipulates the brake wheel 122, which represents the target object 132, by extending the robotic arm 210 to the brake wheel 122, grasping the brake wheel 122, and then rotating the brake wheel 122 in a designated direction to release the hand brakes 124. After one or both robotic machines 101, 102 confirm that the hand brakes 124 of the second vehicle 54 are released, the assigned task is completed. The robotic machines 101, 102 may move to other vehicles (not shown) in the vehicle system 50 to perform the same assigned task on the other vehicles.

In another embodiment, the robotic machines 101, 102 may be assigned the task of coupling or uncoupling the vehicle 52 relative to the vehicle 54. The robotic machines 101, 102 may both be land-based (instead of the aerial machine 101 shown in FIG. 1) and configured to perform the task by engaging and manipulating the mechanical couplers 126 of the vehicles 52, 54 which represent target objects. For example, the first robotic machine 101 may engage the coupler 126 at the front 128 of the first vehicle 52, and the second robotic machine 102 may engage the coupler 126 at the rear 130 of the second vehicle 54. The robotic machines 101, 102 collaborate during the performance of the assigned task in order to couple or uncouple the vehicles 52, 54 relative to each other.

Yet another potential assigned task that may be assigned to the robotic machines 101, 102 is hose lacing, which refers to connecting (or disconnecting) the air hoses 114, 118 of the vehicles 52, 54 to each other to fluidly connect the air brake systems 100 of the vehicles 52, 54. For example, both robotic machines 101, 102 may have robotic arms like the robotic arm 210 of the grasping robotic machine 101 shown in FIG. 1. The first robotic machine 101 may grasp an end of the hose 118 at the front end 128 of the first vehicle 52, and the second robotic machine 102 grasps an end of the hose 114 at the rear end 130 of the second vehicle 54. The robotic machines 101, 102 communicate and collaborate to align (e.g., tilt, rotate, translate, or the like) the hoses 118, 114 of the two vehicles 52, 54 with each other and then move the hoses 118, 114 relative to each other to connect the hoses 118, 114 at the separable interface 119.

Although four potential tasks for the robotic machines 101, 102 to perform on a vehicle are described with reference to FIG. 1, the robotic machines 101, 102 may be configured to perform various other tasks on the vehicle system 50 (or other vehicle systems) that involve manipulating and/or inspecting a target object.

Figure 2:
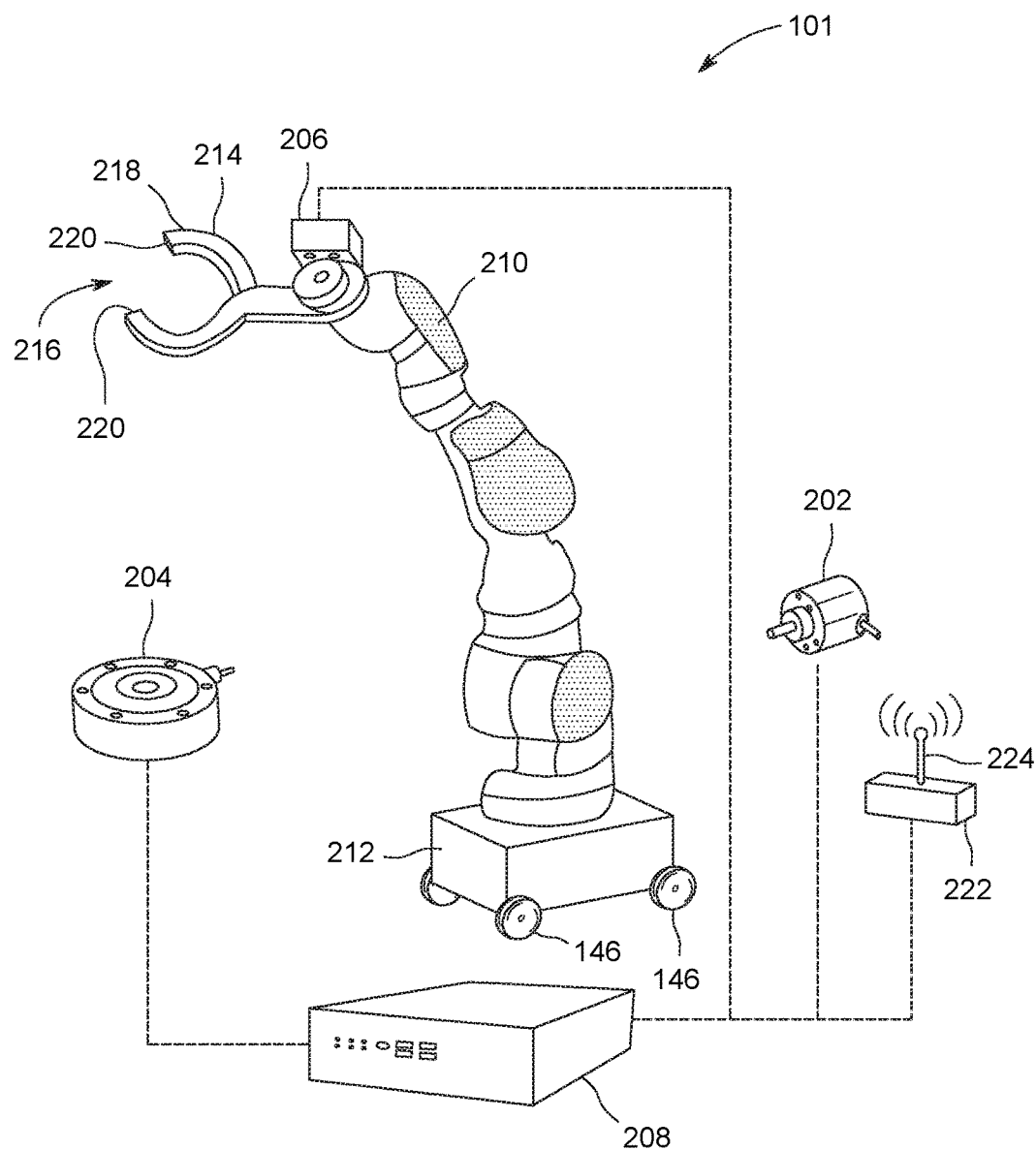
FIG. 2 illustrates one embodiment of the first robotic machine shown in FIG. 1.

FIG. 2 illustrates one embodiment of the first robotic machine 101 shown in FIG. 1. The grasping robotic machine 101 is shown in a partially exploded view with several components (e.g., 202, 204, 208, and 222) displayed spaced apart from the robotic arm 210. The robotic arm 210 may be mounted on a mobile base 212 that includes the wheels 146. The mobile base 212 moves the robotic arm 210 towards the target object of the vehicle and also transports the arm 210 from vehicle to vehicle. The robotic arm 210 is configured to move in multiple different directions and planes relative to the base 212 under the control of a controller 208. The controller 208 drives the robotic arm 210 to move toward the corresponding target object (e.g., the brake lever 110 shown in FIG. 1) to engage the target object and manipulate the target object to perform the assigned task. For example, the controller 208 may convey commands in the form of electrical signals to actuators, motors, and/or other devices of the robotic arm 210 that provide a kinematic response to the received commands.

The controller 208 represents hardware circuitry that includes, represents, and/or is connected with one or more processors (e.g., microprocessors, field programmable gate arrays, integrated circuits, or other electronic logic-based devices). The controller 208 may include and/or be communicatively connected with one or more digital memories, such as computer hard drives, computer servers, removable hard drives, etc. The controller 208 is communicatively coupled with the robotic arm 210 and the mobile base 212 by one or more wired and/or wireless connections that allow the controller 208 to dictate how and where the grasping robotic machine 101 moves. Although shown as a separate device that is not attached to the robotic arm 210 or the mobile base 212, the controller 208 may be mounted on the robotic arm 210 and/or the mobile base 212.

The robotic arm 210 may include an end effector 214 at a distal end 216 of the robotic arm 210 relative to the mobile base 212. The end effector 214 is configured to directly engage the target object on the vehicle to manipulate the target object. For example, the end effector 214 may grasp the brake lever 110 (shown in FIG. 1) to hold the lever 110 such that subsequent movement of the robotic arm 210 moves the brake lever 110 with the arm 210. In the illustrated embodiment, the end effector 214 has a claw 218 that is controllable to adjust a width of the claw 218 to engage and at least partially enclose the target object. The claw 218 includes at least two fingers 220 that are movable relative to each other. For example, at least one of the fingers 220 is movable relative to the other finger 220 to adjust the width of the claw 218 and allow the claw 218 to grasp the target object. The end effector 214 may have other shapes in other embodiments.

The grasping robotic machine 101 also includes a communication circuit 222. The communication circuit 222 is operably connected to the controller 208, and may represent hardware and/or software that is used to communicate with other devices and/or systems, such as another robotic machine (e.g., the second robotic machine 102 shown in FIG. 1) configured to collaborate with the robotic machine 101 to perform the assigned task, remote servers, computers, satellites, and the like. The communication circuit 222 may include a transceiver and associated circuitry (e.g., an antenna 224) for wireless bi-directional communication of various types of messages, such as task command messages, notification messages, reply messages, feedback messages, or the like. The communication circuit 222 may be configured to transmit messages to specific designated receivers and/or to broadcast messages indiscriminately. In an embodiment, the communication circuit 222 is configured to receive and convey messages to the controller 208 prior to and/or during the performance of an assigned task. As described in more detail herein, the information received by the communication circuit 222 from remote sources, such as another robotic machine collaborating with the robotic machine 101, may be used by the controller 208 to control the timing and movement of the robotic arm 210 during the performance of the assigned task. Although the communication circuit 222 is illustrated as a box-shaped device that is separate from the robotic arm 210 and the mobile base 212, the communication circuit 222 may be mounted on the robotic arm 210 and/or the mobile base 212.

The grasping robotic machine 101 includes one or more sensors 202, 204, 206 that monitor operational parameters of the grasping robotic machine 101 and/or the target object that the robotic machine 101 is configured to manipulate. The operational parameters are communicated from the respective sensors 202, 204, 206 to the controller 208, which examines the parameters to make determinations regarding the control of the robotic arm 210, the mobile base 212, and the communication circuit 222. In the illustrated example, the robotic machine 101 includes an encoder sensor 202 that converts rotary and/or linear positions of the robotic arm 210 into one or more electronic signals. The encoder sensor 202 can include one or more transducers that generate the electronic signals as the arm 210 moves. The electronic signals can represent displacement and/or movement of the arm 210, such as a position, velocity, and/or acceleration of the arm 210 at a given time. The position of the arm 210 may refer to a displaced position of the arm 210 relative to a reference or starting position of the arm 210, and the displacement may indicate how far the arm 210 has moved from the starting position. Although shown separated from the robotic arm 210 and mobile base 212 in FIG. 2, the encoder sensor 202 may be mounted on the robotic arm 210 and/or the mobile base 212 in an embodiment.

The grasping robotic machine 101 may also include an imaging sensor 206 that is installed on the robotic arm 210. In an embodiment, the imaging sensor 206 is mounted on or at least proximate to the end effector 214. For example, the imaging sensor 206 includes a field of view that encompasses at least a portion of the end effector 214. The imaging sensor 206 moves with the robotic arm 210 as the robotic arm 210 moves toward the brake lever 110. The imaging sensor 206 acquires perception information of a working environment of the robotic arm 210. The perception information includes images and/or video of the target object in the working environment. The perception information is conveyed to the controller 208 as electronic signals. The controller 208 may use the perception information to identify and locate the target object relative to the robotic arm 210 during the performance of the assigned task. Optionally, the perception information may be three-dimensional data used for mapping and/or modeling the working environment. For example, the imaging sensor 206 may include an infrared (IR) emitter that generates and emits a pattern of IR light into the environment, and a depth camera that analyzes the pattern of IR light to interpret perceived distortions in the pattern. The imaging sensor 206 may also include one or more color cameras that operate in the visual wavelengths. The imaging sensor 206 may acquire the perception information at an acquisition rate of at least 15 Hz, such as approximately 30 Hz. Optionally, the imaging sensor 206 may be a Kinect™ sensor manufactured by MICROSOFT.

The robotic machine 101 further includes a force sensor 204 that monitors forces applied by the robotic arm 210 on the target object during the performance of the assigned task as the robotic arm 210 manipulates the target object. As used herein, the term "force" encompasses torque, such that the forces applied by the robotic arm 210 on the target object described herein may or may not result in the target object twisting or rotating. The force sensor 204 may communicate electronic signals to the controller 208 that represent the forces exerted by the robotic arm 210 on the target object, as monitored by the force sensor 204. The forces may represent forces applied by the claw 218 of the end effector 214 on the target object. The forces may also represent forces applied on various joints of the robotic arm 210 for moving and maneuvering the arm 210.

Optionally, the robotic machine 101 may include one or more other sensors in addition to, or instead of one or more of, the sensors 202, 204, 206 shown in FIG. 2. For example, the robotic machine 101 may include an acoustic sensor that detects sounds generated during actuation of the brake lever 110 (shown in FIG. 1) to determine whether the brake lever 110 has been actuated to release the air brake system 100 (FIG. 1). The robotic machine 101 may also include one or more sensors that monitor the speed of the mobile base 212 and/or the speed at which the robotic arm 210 moves relative to the base 212.

Figure 3:
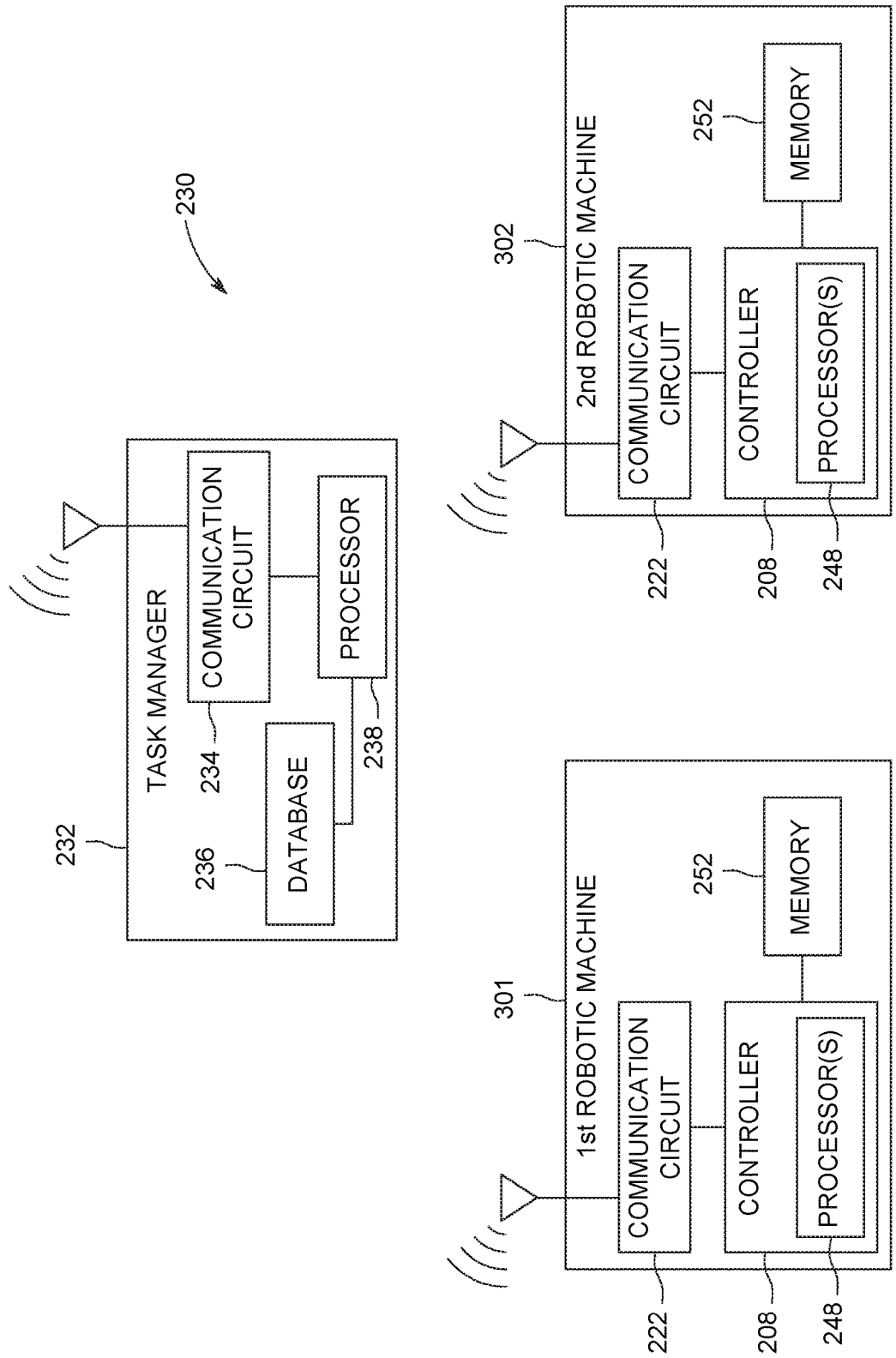
FIG. 3 is a schematic block diagram of a control system for controlling first and second robotic machines to collaborate to perform an assigned task on a vehicle.

FIG. 3 is a schematic block diagram of a control system 230 for controlling first and second robotic machines 301, 302 to collaborate to perform an assigned task on a vehicle. The control system 230 includes the first and second robotic machines 301, 302 and a task manager 232. The task manager 232 may be located remote from the first robotic machine 301 and/or the second robotic machine 302. The task manager 232 is configured to communicate with the robotic machines 301, 302 to provide instructions to the robotic machines 301, 302 regarding the performance of an assigned task that involves manipulating and/or inspecting a target object on a vehicle. The first and second robotic machines 301, 302 may use the information received from the task manager 232 to plan and execute the assigned task.

The first and second robotic machines 301, 302 may or may not be the grasping robotic machine 101 and the aerial robotic machine 102, respectively, of the embodiment shown in FIG. 1. For simplicity of description, FIG. 3 does not illustrate all of the components of the robotic machines 301, 302, such as the robotic arm 210 and the propellers 148 (both shown in FIG. 1). Each of the robotic machines 301, 302 may include a communication circuit 222 and a controller 208 as described with reference to FIG. 2. Each of the controllers 208 includes one or more processors 248. The controllers 208 are optionally operatively connected to respective digital memory devices 252.

The task manager 232 includes a communication circuit 234, at least one processor 238, and a digital database 236, which may represent or be contained in a digital memory device (not shown). The processor 238 is operatively coupled to the database 236 and the communication circuit 234. The task manager 232 may be or include a computer, a server, an electronic storage device, or the like. The database 236 may be, or may be contained in, a tangible and non-transitory (e.g., not a transient signal) computer readable storage medium. The database 236 stores information corresponding to multiple robotic machines in a group of robotic machines that includes the first and second robotic machines 301, 302. For example, the database 236 may include a list identifying the robotic machines in the group and providing capabilities or affordances associated with each of the robotic machines in the list. The database 236 may also include information related to one or more potential assigned tasks, such as a sequence of sub-tasks to be performed in order to accomplish or complete the assigned task. Optionally, the database 236 may include information about one or more vehicles on which an assigned task is to be performed, such as information about types and locations of various potential target objects on the vehicles to be manipulated in the performance of an assigned task. The processor 238 is configured to access the database 236 to retrieve information specific to an assigned task, a vehicle on which the assigned task is to be performed, and/or a robotic machine that may be assigned to perform the task. Although shown as a single, unitary hardware device, the task manager 232 may include multiple difference hardware devices communicatively connected to one another. For example, in an embodiment, the task manager 232 may be one or more servers located at a data center, a railroad dispatch location, a control center, or the like.

The task manager 232 is configured to communicate with the first and second robotic machines 301, 302 via the transmission of messages from the communication circuit 234 to the communication circuits 222 of the robotic machines 301, 302. For example, the task manager 232 may communicate messages wirelessly in the form of electromagnetic radio frequency signals. The first and second robotic machines 301, 302 are configured to transmit messages to the task manager 232 via the respective communication circuits 222. The robotic machines 301, 302 are also able to communicate with each other using the communication circuits 222. For example, the robotic machines 301, 302 may transmit status-containing notification messages back and forth as the robotic machines 301, 302 collaborate to perform an assigned task in order to coordinate the actions of the robotic machines 301, 302 to perform the assigned task correctly and efficiently.

Figure 4:
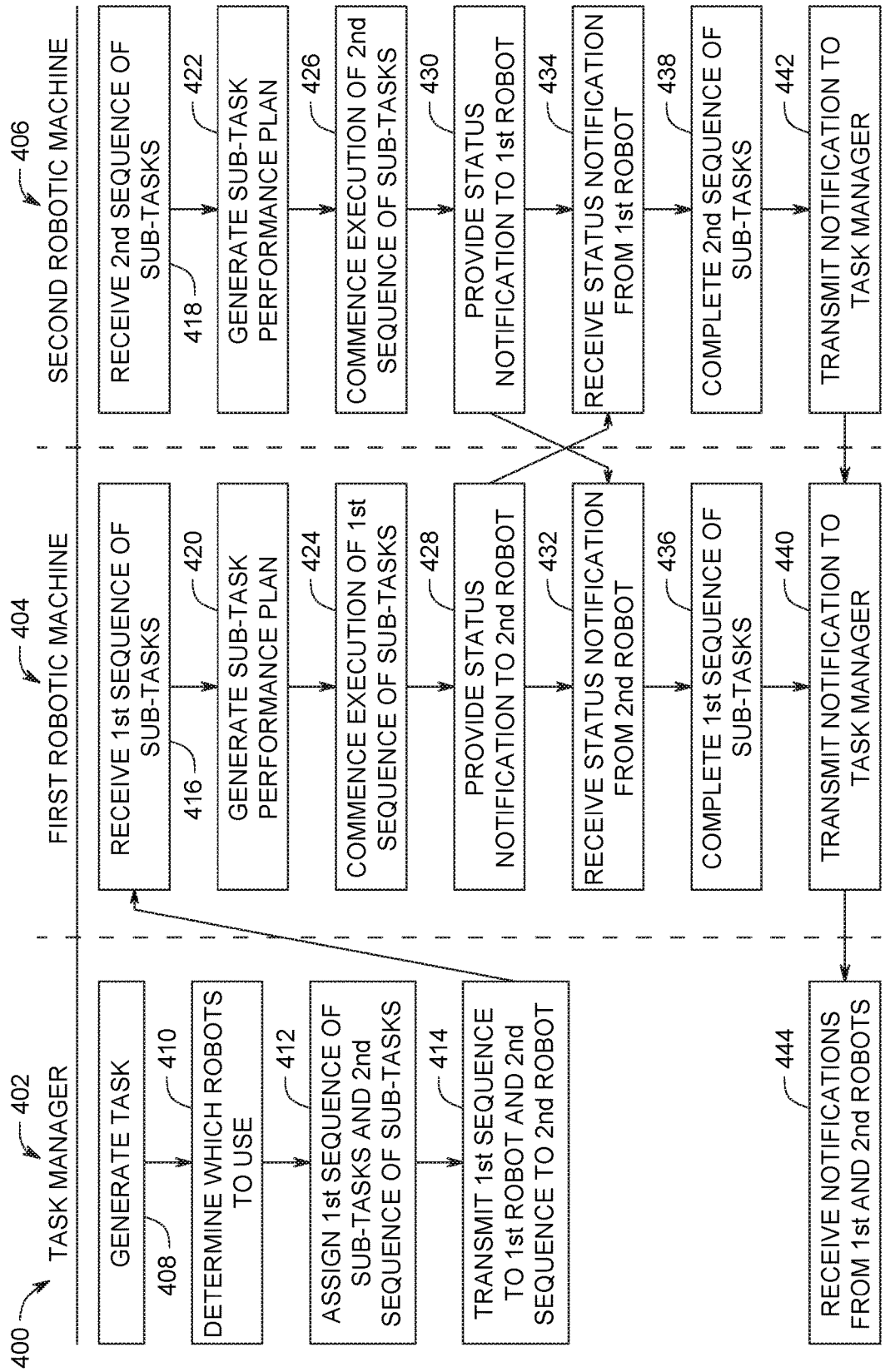
FIG. 4 is a flow diagram showing interactions of a task manager and the first and second robotic machines of FIG. 3 to control and coordinate the performance of an assigned task by the robotic machines on a vehicle according to an embodiment.

FIG. 4 is a flow diagram 400 showing interactions of the task manager 232 and the first and second robotic machines 301, 302 of FIG. 3 to control and coordinate the performance of an assigned task by the robotic machines 301, 302 on a vehicle according to an embodiment. The flow diagram is divided into a first column 402 listing actions or steps taken by the task manager 232, a second column 404 listing actions or steps taken by the first robotic machine 301, and a third column 406 listing actions or steps taken by the second robotic machine 302. At 408, the task manager is configured to generate a task that involves manipulating and/or inspecting a target object on a vehicle. Various example tasks are described above with reference to FIG. 1, including brake bleeding of an air brake system, setting or releasing a hand brake, inspecting a position of a brake actuator (e.g., a lever, a wheel, or the like), mechanically coupling or uncoupling a vehicle relative to another vehicle, hose lacing to connect or disconnect an air hose of a vehicle to an air hose of another vehicle, or the like. Optionally, the task may be a scheduled task, and the task manager generates the task responsive to the task being due to be performed. Alternatively, the task manager may generate the task upon receiving a request that the task be performed, such as from a user interface connected to the task manager or from a remote source via a communicated message.

At 410, the task manager determines which robotic machines (e.g., robots) to employ to work together to perform the designated task. For example, the database 236 of the task manager 232 shown in FIG. 3 may store information about the designated task, including which sub-goals or sub-tasks may be required or at least helpful to accomplish the designated task efficiently. The sub-tasks are steps in the process of performing the task, such as moving toward a target object, engaging a certain portion of the target object, and applying a specific force on the target object to move the target object for a specified distance in a specified direction. The database 236 may also store information about a group of multiple robotic machines including, but not limited to, the first and second robotic machines 301, 302 shown in FIG. 3. The information about the robotic machines may include capability descriptions associated with each robotic machine in the group. The capability descriptions may include a list of the capabilities or affordances of the corresponding robotic machine, such as the capability to grasp and pull a lever. The at least one processor 238 of the task manager 232 may perform an affordance analysis by comparing the sub-tasks associated with the designated task to the capability descriptions of the available robotic machines in the group. The at least one processor 238 determines a level of suitability of each of the available robotic machines to the specific sub-tasks for the designated task. The available robotic machines may be ranked according to the level of suitability. For example, robotic machines that are capable of flying would rank highly for sub-tasks involving flight, but robotic machines incapable of flight would rank low for the same sub-tasks. The at least one processor 238 may be configured to rank the robotic machines, and determine the robotic machines to employ for the designated task based on the highest ranking available robotic machines for the sub-tasks.

In an example, the designated task involves manipulating a brake actuator, which generally requires a robotic arm engaging the brake actuator to move the brake actuator. If none of the available robotic machines that have robotic arms are tall enough or able to extend far enough to engage the brake actuator, the processor 238 of the task manager 232 may select one of the highest ranking available robotic machines that has a robotic arm. The processor 238 may also analyze the rest of the available robotic machines to determine which robotic machines are able to assist the robotic machine with the robotic arm. The processor 238 may select a robotic machine that is capable of lifting the robotic machine having the robotic arm, such that the robotic arm is able to engage and manipulate the brake actuator when lifted. Thus, the task manager may select the robotic machines to employ for performing the designated task based on the suitability of the robotic machines to perform required sub-tasks as well as the suitability of the robotic machines to coordinate with each other.

At 412, the task manager assigns a first sequence of sub-tasks to a first robotic machine and assigns a second sequence of sub-tasks to a second robotic machine. Although not shown in the illustrated embodiment, the task manager may assign sub-tasks to more than two robotic machines in other embodiments. For example, some tasks may require three or more robotic machines working together to complete. The sequences of sub-tasks are specific steps or actions to be performed by the corresponding robotic machines in a specific order. The sub-tasks are similar to instructions. The performance of all of the sub-tasks by the corresponding robotic machines in the correct order may complete or accomplish the assigned task. The first and second sequences of sub-tasks are coordinated with each other. The first sequence of sub-tasks (to be performed by the first robotic machine) in an embodiment is at least partially different than the second sequence of sub-tasks (to be performed by the second robotic machine). For example, at least some of the sub-tasks in the first sequence may differ from at least some of the sub-tasks in the second sequence, or vice-versa. Some sub-tasks may be common to both the first and second sequences, such that the sub-tasks are performed by both robotic machines. In an embodiment, the first and second sequences of sub-tasks delineate specific steps or actions to be performed by the respective robotic machines and also provide timing information. For example, the first sequence may specify an order that the sub-tasks are to be performed relative to each other and also relative to the sub-tasks in the second sequence to be performed by the second robotic machine. Thus, the first sequence may specify that after completing a given sub-task, the first robotic machine is to wait until receiving a notification from the second robotic machine that a specific sub-task in the second sequence is completed before starting a subsequent sub-task in the first sequence.

The first and second sequences of sub-tasks may be generated by the at least one processor 238 of the task manager 232 after determining which robotic machines to use, or may be pre-stored in the database 236 or another memory device. For example, the database 236 may store a list of potential assigned tasks and sequences of sub-tasks associated with each of the assigned tasks. Thus, upon generating the task and/or determining the robotic machines, the processor 238 may access the database 236 to select the relevant sequences of sub-tasks associated with the assigned task.

At 414, the task manager is configured to transmit the first sequence of sub-tasks to the first robotic machine and the second sequence of sub-tasks to the second robotic machine. For example, the first and second sequences may be transmitted in respective command messages via the communication circuit 234 of the task manager 232. The task manager 232 communicates a command message containing the first sequence of sub-tasks to the first robotic machine and another command message containing the second sequence to the second robotic machine.

At 416, the first robotic machine receives the command message containing the first sequence of sub-tasks. At 418 the second robotic machine receives the command message containing the second sequence of sub-tasks. The communication circuits 222 of the first and second robotic machines 301, 302 shown in FIG. 3 receive the command messages and communicate the contents to the respective controllers 208. At 420, the first robotic machine generates a sub-task performance plan based on the first sequence of sub-tasks. The sub-task performance plan is motion planning by the first robotic machine that yields various motions, actions, and forces, including torques, to be produced by different components of the first robotic machine to perform the sub-tasks in the first sequence. The one or more processors 248 of the first robotic machine 301 may use dynamic movement primitives to generate the performance plan. In an embodiment in which the first robotic machine may include the robotic arm 210 (shown in FIG. 2), the sub-task performance plan may include a motion trajectory that plans the movement of the robotic arm 210 from a starting position to the target object on the vehicle. The sub-task performance plan may also provide a prescribed approach orientation of the robotic arm 210, including the claw 218 of the end effector 214 (shown in FIG. 2), as the robotic arm 210 approaches and engages the target object, and planned forces to be exerted by the robotic arm 210 on the target object to manipulate the target object (e.g., a planned pulling force, direction of the force, and/or distance along which the force is applied). In other embodiments, the sub-task performance plan may specify coordinates and/or distances that the first robotic machine, or components thereof, moves. At 422, the second robotic machine generates a sub-task performance plan based on the second sequence of sub-tasks. The sub-task performance plan of the second robotic machine is different than the sub-task performance plan of the first robotic machine, but may be generated in a similar manner to the sub-task performance plan of the first robotic machine.

At 424, the first robotic machine commences execution of the first sequence of sub-tasks. At 426, the second robotic machine commences execution of the second sequence of sub-tasks. Although steps 424 and 426 are shown side-by-side in the diagram 400 of FIG. 4, the first and second robotic machines may or may not perform the respective sub-tasks during the same time period. Depending on the sequences of sub-tasks as communicated by the task manager, the first robotic machine may be ordered to start performing the sub-tasks in the first sequence before or after the second robotic machine starts performing the second sequence of sub-tasks.

In an embodiment, the first and second robotic machines are configured to coordinate performance of the respective sequences of sub-tasks to accomplish the assigned task. Thus, the performance of the first sequence of sub-tasks by the first robotic machine is coordinated with the performance of the second sequence of sub-tasks by the second robotic machine. In an embodiment, the first and second robotic machines coordinate by communicating directly with each other during the performances of the sub-tasks. At 428, the first robotic machine provides a status notification to the second robotic machine. The status notification may be a message that communicated wirelessly as electromagnetic RF signals from the communication circuit 222 of the first robotic machine 301 to the communication circuit 222 of the second robotic machine 302. The second robotic machine receives the status notification at 434. The status notification may inform the second robotic machine that the first robotic machine has started or completed a specific sub-task in the first sequence. The second robotic machine processes the received status notification and may use the status notification to determine when to start performing certain sub-tasks in the second sequence. For example, at least some of the sub-tasks in the first and second sequences may be sequential, such that the second robotic machine is configured to begin performance of a corresponding sub-task in the second sequence responsive to receiving the notification from the first robotic machine that the first robotic machine has completed a specific sub-task in the first sequence. Other sub-tasks in the first and second sequences may be performed concurrently by the first and second robotic machines, such that the time period that the first robotic machine performs a given sub-task in the first sequence at least partially overlaps the time period that the second robotic machine performs a given sub-task in the second sequence. For example, both robotic machines may concurrently move towards the vehicle. In another example, the first robotic machine may extend a robotic arm towards the target object of the vehicle concurrently with the second robotic machine lifting the first robotic machine. Coordinated and concurrent actions by the robotic machines may enhance the efficiency of the performance of the assigned task on the vehicle.

The first robotic machine may be configured to transmit a status notification upon starting and/or completing each sub-task in the first sequence, or may transmit status notifications only upon starting and/or completing certain designated sub-tasks of the sub-tasks in the first sequence, which may be identified in the command message sent from the task manager. At 430, the second robotic machine provides a status notification to the first robotic machine. The status notification from the second robotic machine may be similar in form and/or function to the status notification sent from the first robotic machine at 428. The first robotic machine receives the status notification from the second robotic machine at 432.

At 436 and 438, respectively, the first and second robotic machines complete the performances of the first and second sequences of sub-tasks. At 440, the first robotic machine transmits a task completion notification to the task manager that the first sequence is completed. At 442, the second robotic machine transmits a task completion notification to the task manager that the second sequence is completed. The first and second robotic machines may also notify each other upon completing the sequences of sub-tasks, and optionally may only transmit a single task completion notification to the task manager instead of one notification from each robotic machine. The one or more notifications inform the task manager that the assigned task is completed. At 444, the task manager receives and processes the one or more notifications. The notification may also provide feedback information to the task manager, such as force parameters used to manipulate the target object on the vehicle and other parameters monitored and recorded during the performance of the sub-tasks. The information received in the task completion notification may be used by the task manager to update the information provided in future command messages to robotic machines, such as the sequences of sub-tasks contained in the command messages. Upon receiving the task completion notification, the task manager may generate a new task for the same or different robotic machines. For example, the task manager may assign the same task to the same robotic machines for the robotic machines to perform the task on another vehicle in the same or a different vehicle system. Thus, the first and second robotic machines may be controlled to move along a length of a vehicle system to perform the assigned task on multiple vehicles of the vehicle system. Alternatively, the task manager may control the same or different robotic machines to perform a different assigned task on the same vehicle after completion of a first assigned task on the vehicle.

Figure 5:
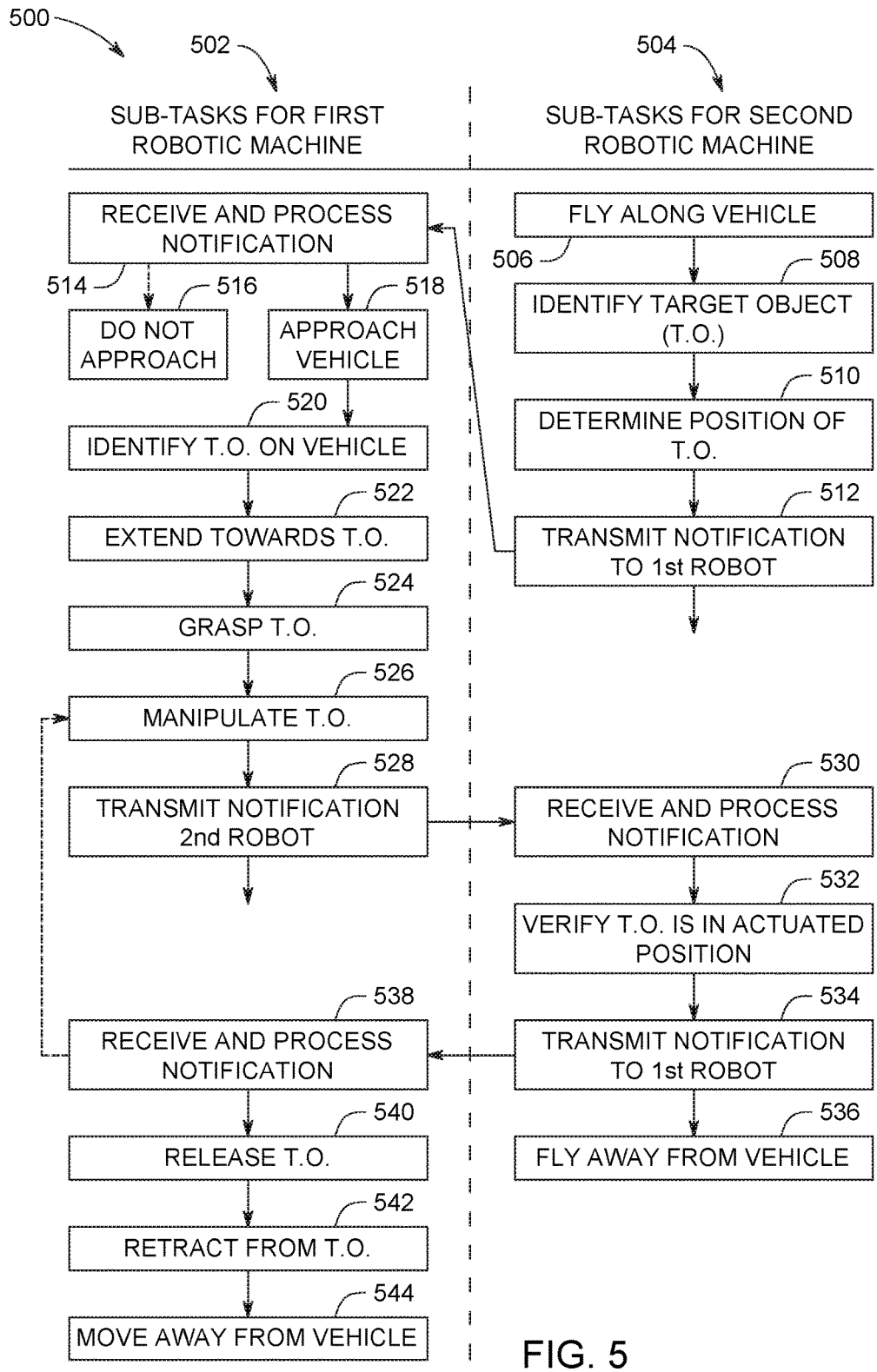
FIG. 5 is a block flow diagram showing a first sequence of sub-tasks assigned to a first robotic machine and a second sequence of sub-tasks assigned to a second robotic machine for performance of an assigned task on a vehicle according to an embodiment.

FIG. 5 is a block flow diagram 500 showing a first sequence 502 of sub-tasks assigned to a first robotic machine and a second sequence 504 of sub-tasks assigned to a second robotic machine for performance of an assigned task on a vehicle according to an embodiment. The diagram 500 is described with reference to the grasping robotic machine 101 and the aerial second robotic machine 102 shown in FIG. 1. In the illustrated embodiment, the assigned task is to manipulate a brake actuator of the first vehicle 52 of FIG. 1, such as the brake wheel 122 of the hand brake system 120 or the brake lever 110 of the air brake system 100. The first and second sequences 502, 504 of sub-tasks may be transmitted to the grasping and aerial robotic machines 101, 102 by the task manager 232 (shown in FIG. 3).

The first sub-task in the second sequence 504 at 506 commands the aerial robotic machine 102 to fly along the vehicle 52, such as above or along a side of the vehicle 52. At 508, the aerial robotic machine 102 identifies the target object, which is the brake actuator. The aerial robotic machine 102 may use the imaging device 150 to generate image data of the surrounding environment including the vehicle 52. One or more processors (e.g., the processors 248 shown in FIG. 3) of the aerial robotic machine may be configured to provide image analysis to identify the brake actuator in the image data captured by the imaging device 150. The aerial robotic machine 102 at 510 determines a position of the target object, such as a location of the brake actuator relative to the vehicle 52 and/or whether the brake actuator is in an actuated or non-actuated position relative to the vehicle 52. For example, if the aerial robotic machine 102 determines that the brake actuator is already in an actuated position, there is no need to manipulate the brake actuator. The actuated position may represent, for example, a pulled position of the brake lever 110 that indicates that the air brakes 106 are bled, or a rotated position of the brake wheel 122 that indicates that the hand brakes 124 are released. The aerial robotic machine 102 determines the position of the target object using image analysis. At 512, the aerial robotic machine 102 transmits a status notification to the grasping robotic machine 101. The status notification may be similar to the status notifications described at 428 and 430 in FIG. 4. The status notification provides the position of the target object to the grasping robotic machine 101.

At 514, the grasping robotic machine 101 receives and processes the status notification transmitted by the aerial robotic machine 102. The one or more processors (e.g., the processors 248 shown in FIG. 3) of the robotic machine 101 determine whether or not to approach the vehicle 52. For example, since the task is to actuate a brake actuator of the vehicle 52, if the status notification indicates that the brake actuator is already in the actuated position, then there is no need to manipulate the brake actuator. Thus, if the brake actuator is in the actuated position, the grasping robotic machine 101 at 516 does not approach the vehicle. Instead, the robotic machine 101 may move towards another vehicle on which the robotic machine 101 may be assigned to perform a task. If, on the other hand, the brake actuator is determined by the aerial robotic machine 102 to be in a non-actuated position, then the grasping robotic machine 101 at 518 approaches the vehicle. For example, the robotic machine 101 may drive or otherwise move along the ground towards the vehicle and proximate to the brake actuator thereof.

At 520, the grasping robotic machine 101 identifies the target object on the vehicle 52. The robotic machine 101 may identify the target object using image analysis based on image data captured by the imaging sensor 206 (shown in FIG. 2). The image analysis may determine the location, tilt, size, and other parameters of the target object. At 522, the robotic machine 101 extends towards the target object. For example, the robotic arm 210 (shown in FIG. 1) may extend from a retracted position to an extended position by generating torques at various joints along the arm 210 and/or by telescoping. At 524, the robotic machine 101 grasps and engages the target object. For example, the claw 218 of the end effector 214 (shown in FIG. 2) may grasp the brake actuator that defines the target object. At 526, the robotic machine 101 manipulates the target object. In an embodiment, the robotic arm 210 manipulates the brake actuator by moving the brake actuator from the non-actuated position to the actuated position. The robotic arm 210 may rotate the brake wheel 122, translate the brake lever 110, or the like, to move the brake actuator to the actuated position. Upon manipulating the brake actuator, the grasping robotic machine 101 at 528 generates and transmits a status notification to the aerial robotic machine 102. The status notification informs the aerial robotic machine 102 that the target object has been manipulated.

At 530, the aerial robotic machine 102 receives and processes the status notification received from the grasping robotic machine 101. Responsive to being notified that the target object has been manipulated, the aerial robotic machine 102 at 532 verifies whether or not the target object is fully actuated (e.g., has been fully and successfully manipulated to complete the task). For example, for a task to bleed air brakes, the verification includes validating that the valve 108 of the air brake system 100 has been sufficiently opened such that a sufficient amount of air has been released from the air brake system 100 to allow the brakes 106 to move to a released state. Verification by the aerial robotic machine 102 may be accomplished by various methods, including audibly recording the release of air using an audible sensor, detecting movement of the brakes to the released state using the imaging device 150, detecting that the brake lever 110 is in a designated actuated position using the imaging device 150, and/or the like. Although not shown, the grasping robotic machine 101 may also verify whether the brake lever 110 is fully actuated, such as by using the encoder 202 to detect that the robotic arm 210 has moved the lever 110 to a designated location, using the force sensor 204 to detect the force exerted on the brake lever 110, and/or the like.

After the verification step, the aerial robotic vehicle 102 at 534 transmits a status notification to the grasping robotic machine 101, which is received by the robotic machine 101 at 538. The status notification contains the results of the verification step, such as whether or not the brake actuator has been fully actuated and the task has been successfully completed. If the status notification indicates that the brake actuator is not in the actuated position, then the grasping robotic machine 101 may return to 526 and manipulate the brake actuator for a second time. If, on the other hand, the status notification indicates that the brake actuator is actuated and the task is successfully completed, then the grasping robotic machine 101 may, at 540, control the robotic arm 210 to release the brake actuator that defines the target object. At 542, the robotic arm 210 retracts away from the target object, returning to a retracted position on the robotic machine 101. At 544, the grasping robotic machine 101 moves on the ground away from the vehicle 52.

At 536, the aerial robotic machine 102 flies away from the vehicle 52. For example, the aerial robotic machine 102 may fly towards a subsequent vehicle (e.g., the second vehicle 54 shown in FIG. 1), and may repeat the first sequence 504 of sub-tasks for the second vehicle 54. Although not shown, the aerial robotic machine 102 may provide guidance for the grasping robotic machine 101 as the grasping robotic machine 101 moves along the ground. The aerial robotic machine 102 provides guidance by monitoring for obstacles along a path of the robotic machine 101, and may notify the robotic machine 101 if the aerial robotic machine 102 detects the presence of an obstacle.

As shown in FIG. 5, the two robotic machines 101, 102 collaborate during the performance of the respective sub-tasks to accomplish the assigned task. The aerial robotic machine 102 may inspect the target object, verify actuation of the target object, and/or provide guidance for the grasping robotic machine 101. The grasping robotic machine 101 may engage and manipulate the target object on the vehicle. It is recognized that at least some of the sub-tasks in the first and second sequences 502, 504 are sequential, and at least some may be concurrent. For example, the grasping robotic machine 101 does not approach the vehicle at 518 until receiving the notification from the aerial robotic machine 102 that is transmitted at 512. The aerial robotic machine 102 may perform the sub-task of flying away from the vehicle at 536 concurrently to the grasping robotic machine 101 releasing the target object, retracting from the target object, and/or moving away from the vehicle at 540-544.

Figure 6:
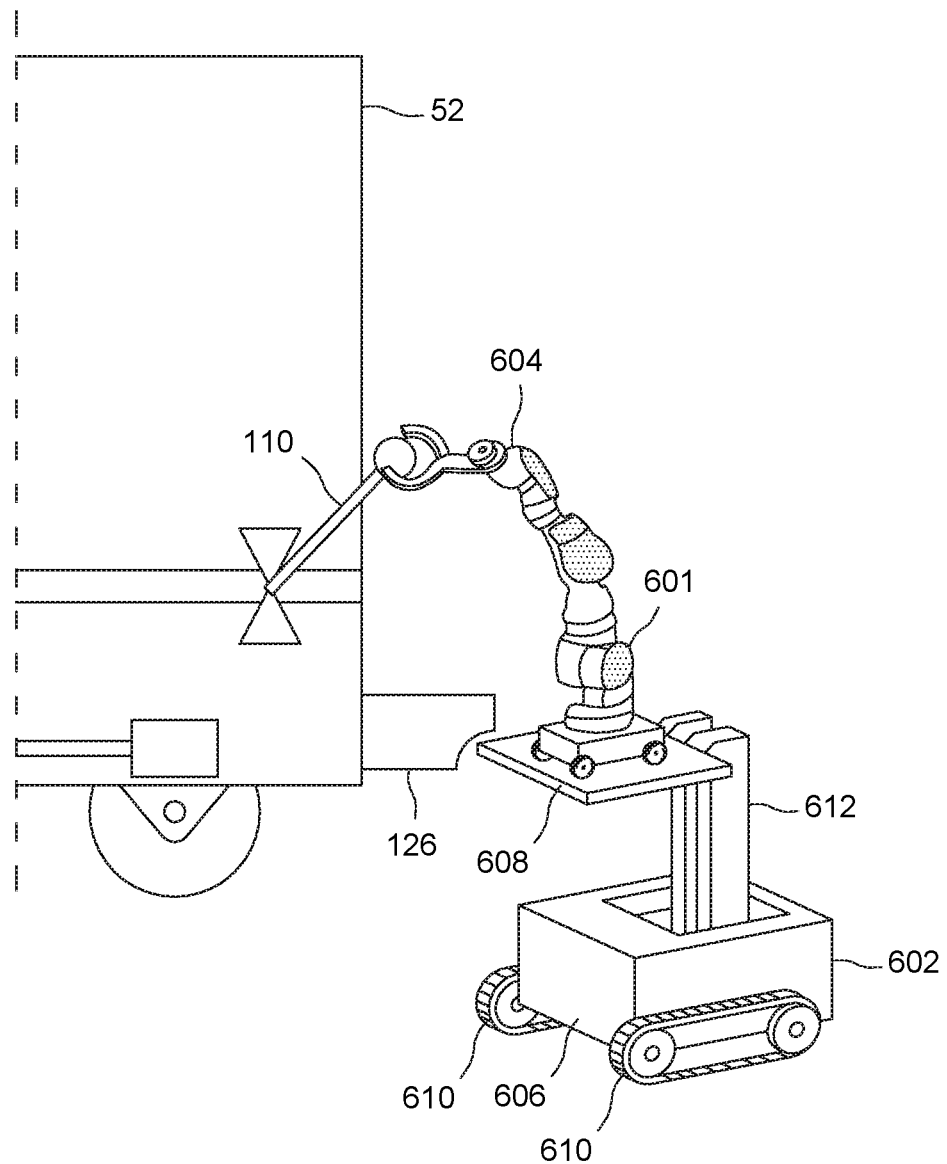
FIG. 6 is a perspective view of two robotic machines collaborating to perform an assigned task on a vehicle according to another embodiment.

FIG. 6 is a perspective view of two robotic machines 601, 602 collaborating to perform an assigned task on a vehicle 52 according to another embodiment. The task involves pulling a brake lever 110 of the vehicle 52. A first robotic machine 601 may be a grasping robotic machine that includes a robotic arm 604 and is at least similar to the grasping robotic machine 101 shown in FIG. 2. In the illustrated embodiment, the grasping robotic machine 601 is too short and cannot extend fax enough to properly reach and engage the brake lever 110. The second robotic machine 602 is a lifting robotic machine that is configured to collaborate with the grasping robotic machine 601 to perform the assigned task. The lifting robotic machine 602 includes a body 606 and a platform 608 that is movable vertically relative to the body 606. The body 606 includes continuous tracks 610 for allowing the robotic machine 602 to navigate obstacles and rocky terrain. The platform 608 is coupled to the body 606 via a telescoping tower 612 that is used to lift and lower the platform 608 relative to the body 606.

In the illustrated embodiment, the assigned task may be performed by the lifting robotic machine 602 and the grasping robotic machine 601 each performing a respective sequence of sub-tasks (e.g., assigned by a task manager). For example, a first sequence of sub-tasks for the grasping robotic machine 601 may include driving onto the platform 608 of the lifting robotic machine 602, when the platform 608 is in a lowered, starting location at or proximate to the ground. A second sequence of sub-tasks for the lifting robotic machine 602 includes lifting the grasping robotic machine 601 on the platform 608 vertically upwards from the starting location to a lifted location that is disposed more proximate to the brake lever 110 (or another target object) than when the grasping robotic machine 601 is in the starting location. Once the grasping robotic machine 601 is in the lifted location, the robotic arm 604 extends to the brake lever 110, grasps the brake lever 110, and manipulates the brake lever 110 by pushing or pulling in a designated direction. After manipulating the brake lever 110 and verifying that the brake lever 110 manipulation has been successfully completed, the grasping robotic machine 601 sends a notification to the lifting robotic machine 602. Responsive to receiving the notification, the lifting robotic machine 602 lowers the platform 608, and the grasping robotic machine 101 thereon, back to the starting location on or proximate to the ground. Alternatively, the lifting robotic machine 602 may lower the platform 608 to an intermediate location, and may carry the grasping robotic machine 601 to another vehicle for performance of the same or a similar task on the other vehicle. An additional robotic machine, such as the aerial robotic machine 102 shown in FIG. 1, optionally may be employed to collaborate with the robotic machines 601, 602 in the performance of the assigned task.

Figure 7:
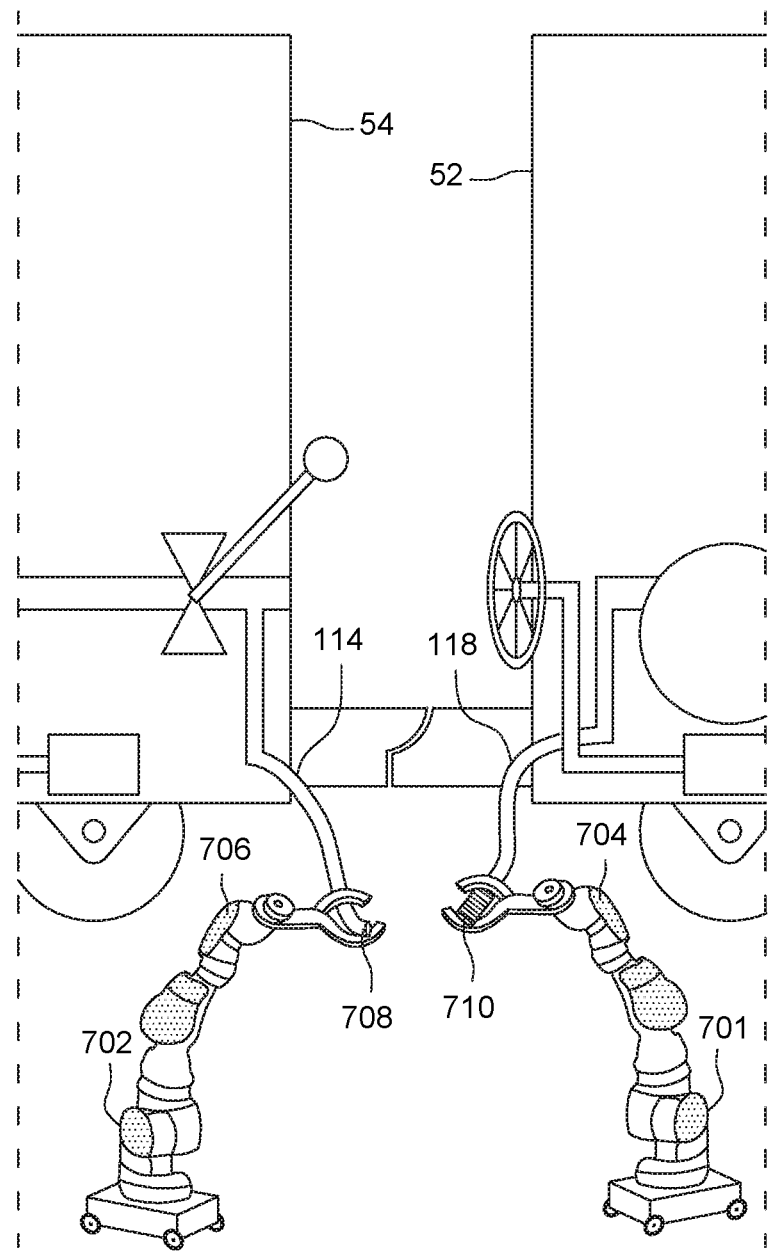
FIG. 7 is a perspective view of two robotic machines collaborating to perform an assigned task on a first vehicle according to yet another embodiment.

FIG. 7 is a perspective view of two robotic machines 701, 702 collaborating to perform an assigned task on a first vehicle 52 according to yet another embodiment. The assigned task involves connecting an air hose 118 of the first vehicle 52 to a corresponding air hose 114 of a second vehicle 54 adjacent to the first vehicle 52. The task may be referred to as hose lacing. The two robotic machines 701, 702 may both be grasping robotic machines at least similar to the grasping robotic machine 101 shown in FIG. 2. The first robotic machine 701 may or may not be the same type of robotic machine as the second robotic machine 702. Both robotic machines 701, 702 include respective robotic arms 704, 706 similar to the robotic arm 210 shown in FIG. 2.

In an embodiment, the first robotic machine 701 is configured to perform the first sequence of sub-tasks by locating and identifying the air hose 118 of the first vehicle 52, then extending the robotic arm 704 and grasping the air hose 118. The second robotic machine 702 is configured to perform the second sequence of sub-tasks by locating and identifying the air hose 114 of the second vehicle 54, then extending the robotic arm 706 and grasping the air hose 114. The second sequence of sub-tasks may instruct the second robotic machine 702 to adjust an orientation of an end 708 of the air hose 114 to a designated orientation relative to the vehicles 52, 54. The first sequence of sub-tasks may instruct the first robotic machine 701 to adjust both the position and orientation of an end 710 of the air hose 118. The robotic arm 704 of the first robotic machine 701 may move relative to the robotic arm 706 of the second robotic machine 702 towards the air hose 114 in order to connect the end 710 of the air hose 118 to the end 708 of the air hose 114. One or both of the robotic arms 704, 706 may move and/or rotate to secure the hoses 114, 118 to one another, such as via a bayonet-style connection. The robotic machines 701, 702 may coordinate the movements by communicating directly with each other during the performance of the assigned task. The robotic machines 701, 702 may also be configured to collaborate to disconnect the air hoses 114, 118 in another assigned task.

In an embodiment, a system (e.g., a control system) includes a first robotic machine, a second robotic machine, and a task manager. The first robotic machine has a first set of capabilities for interacting with a surrounding environment. The second robotic machine has a second set of capabilities for interacting with the surrounding environment. The task manager has one or more processors. The task manager is configured to select the first and second robotic machines from a group of robotic machines to perform a task that involves at least one of manipulating or inspecting a target object of a vehicle that is separate from the first and second robotic machines. The task manager is configured to select the first and second robotic machines to perform the task based on the first and second sets of capabilities of the respective first and second robotic machines. The task manager assigns a first sequence of sub-tasks to the first robotic machine for performance by the first robotic machine and a second sequence of sub-tasks to the second robotic machine for performance by the second robotic machine. The first and second robotic machines are configured to coordinate performance of the first sequence of sub-tasks by the first robotic machine with performance of the second sequence of sub-tasks by the second robotic machine to accomplish the task.

Optionally, the first and second sets of capabilities of the first and second robotic machines each include at least one of flying, driving, lifting, imaging, grasping, rotating, tilting, extending, retracting, pushing, or pulling.

Optionally, the second set of capabilities of the second robotic machine includes at least one capability that differs from the first set of capabilities of the first robotic machine.

Optionally, the task includes at least one of actuating a brake lever to open a valve of an air brake system of the vehicle, setting or releasing a hand brake of the vehicle, mechanically coupling or uncoupling the vehicle relative to another vehicle, or connecting or disconnecting an air hose of the vehicle relative to an air hose of another vehicle.

Optionally, the first and second robotic machines coordinate performance of the first sequence of sub-tasks by the first robotic machine with the performance of the second sequence of sub-tasks by the second robotic machine by communicating directly with each other.

Optionally, responsive to completing a corresponding sub-task in the first sequence, the first robotic machine is configured to notify the second robotic machine that the corresponding sub-task is completed.

Optionally, at least some of the sub-tasks are sequential such that the second robotic machine is configured to begin performance of a corresponding sub-task in the second sequence responsive to receiving a notification from the first robotic machine that the first robotic machine has completed a specific sub-task in the first sequence.

Optionally, the first robotic machine is configured to perform at least one of the sub-tasks in the first sequence concurrently with performance of at least one of the sub-tasks in the second sequence by the second robotic machine.

Optionally, the task manager is configured to access a database that stores capability descriptions corresponding to each of the robotic machines in the group of robotic machines. The task manager is configured to select the first and second robotic machines to perform the task instead of other robotic machines in the group based on a suitability of the capability descriptions of the first and second robotic machines to the task.

Optionally, the first robotic machine is configured to perform the first sequence of sub-tasks by lifting the second robotic machine from a starting location to a lifted location such that the second robotic machine in the lifted location is disposed more proximate to the target object of the vehicle than when the second robotic machine is in the starting location. Responsive to receiving a notification from the second robotic machine that at least one of manipulation or inspection of the target object is complete, the first robotic machine is configured to lower the second robotic machine back to the starting location.

Optionally, the first robotic machine is configured to perform the first sequence of sub-tasks by flying at least one of above or along a side of the vehicle, identifying the target object of the vehicle, determining a position of the target object, and providing a notification to the second robotic machine of the position of the target object. The second robotic machine performs the second sequence of sub-tasks by moving on the ground to the vehicle proximate to the target object, extending a robotic arm of the second robotic machine to the target object, engaging and manipulating the target object, releasing the target object, and retracting the robotic arm.

Optionally, the target object is a brake actuator. The first robotic machine determines whether the brake actuator is in a non-actuated position relative to the vehicle. The second robotic machine moves to the vehicle responsive to the notification from the first robotic machine indicating that the brake actuator is in the non-actuated position. The second robotic machine manipulates the brake actuator to move the brake actuator from the non-actuated position to an actuated position.

Optionally, the vehicle is a first vehicle of a vehicle system that includes multiple vehicles coupled together. The first robotic machine is configured to perform the first sequence of sub-tasks by extending a robotic arm of the first robotic machine and grasping an air hose of the first vehicle that defines the target object. The second robotic machine is configured to perform the second sequence of sub-tasks by extending a robotic arm of the second robotic machine to an air hose of a second vehicle adjacent to the first vehicle in the vehicle system and grasping the air hose. The robotic arms of the first and second robotic machines move relative to one another with the corresponding air hoses to at least one of connect or disconnect the air hoses of the first and second vehicles.

In an embodiment, a system (e.g., a control system) is provided that includes a first robotic machine and a second robotic machine. The first robotic machine has a first set of capabilities for interacting with a surrounding environment. The first robotic machine is configured to receive a first sequence of sub-tasks related to the first set of capabilities of the first robotic machine. The second robotic machine has a second set of capabilities for interacting with the surrounding environment. The second robotic machine is configured to receive a second sequence of sub-tasks related to the second set of capabilities of the second robotic machine. The first and second robotic machines are configured to perform the first and second sequences of sub-tasks, respectively, to accomplish a task that involves at least one of manipulating or inspecting a target object of a vehicle that is separate from the first and second robotic machines. The first and second robotic machines are configured to coordinate performance of the first sequence of sub-tasks by the first robotic machine with performance of the second sequence of sub-tasks by the second robotic machine.

Optionally, the second set of capabilities of the second robotic machine includes at least one capability that differs from the first set of capabilities of the first robotic machine.

Optionally, the task includes at least one of actuating a brake lever to open a valve of an air brake system of the vehicle, setting or releasing a hand brake of the vehicle, mechanically coupling or uncoupling the vehicle relative to another vehicle, or connecting or disconnecting an air hose of the vehicle relative to an air hose of another vehicle.

Optionally, at least some of the sub-tasks are sequential such that the second robotic machine is configured to begin performance of a corresponding sub-task in the second sequence responsive to receiving a notification from the first robotic machine that the first robotic machine has completed a specific sub-task in the first sequence.

Optionally, the first robotic machine is configured to perform the first sequence of sub-tasks by lifting the second robotic machine from a starting location to a lifted location such that the second robotic machine in the lifted location is disposed more proximate to the target object of the vehicle than when the second robotic machine is in the starting location. Responsive to receiving a notification from the second robotic machine that at least one of manipulation or inspection of the target object is complete, the first robotic machine is configured to lower the second robotic machine back to the starting location.

In an embodiment, a system (e.g., a control system) includes a first robotic machine that has a set of capabilities for interacting with a surrounding environment. The first robotic machine has a communication circuit configured to receive a first sequence of sub-tasks for performing a task that involves at least one of manipulating or inspecting a target object of a vehicle that is separate from the first robotic machine. The first sequence of sub-tasks is related to the set of capabilities of the first robotic machine. The first robotic machine is configured to perform the first sequence of sub-tasks. The first robotic, machine is further configured to communicate with a second robotic machine during the performance of the first sequence of sub-tasks. The second robotic machine is separate from the vehicle and configured to perform a second sequence of sub-tasks for performing the task. Completion of both the first and second sequences of sub-tasks accomplishes the task.

Optionally, the first robotic machine is configured to communicate with the second robotic machine during the performance of the first sequence of sub-tasks to coordinate with the second robotic machine such that the first robotic machine starts a corresponding sub-task in the first sequence responsive to a received notification from the second robotic machine that the second robotic machine has at least one of started or completed a specific sub-task in the second sequence.

Optionally, responsive to completing a corresponding sub-task in the first sequence, the first robotic machine is configured to transmit a notification to the second robotic machine that the corresponding sub-task is completed.

Optionally, the first robotic machine has a movable robotic arm. The set of capabilities include capabilities for the robotic arm to extend relative to the first robotic machine, grasp the target object, manipulate the target object, release the target object, and retract relative to the first robotic machine.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry.

Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
  a first robotic machine having a first set of capabilities for interacting with a surrounding environment;
  a second robotic machine having a second set of capabilities for interacting with the surrounding environment; and
  a task manager having one or more processors, the task manager configured to select the first and second robotic machines from a group of robotic machines to perform a task that involves at least one of manipulating or inspecting a brake actuator of a vehicle that is separate from the first and second robotic machines, the task manager configured to select the first and second robotic machines to perform the task based on the first and second sets of capabilities of the respective first and second robotic machines, the task manager assigning a first sequence of sub-tasks to the first robotic machine for performance by the first robotic machine and a second sequence of sub-tasks to the second robotic machine for performance by the second robotic machine,
  wherein the first and second robotic machines are configured to coordinate performance of the first sequence of sub-tasks by the first robotic machine with performance of the second sequence of sub-tasks by the second robotic machine to accomplish the task,
  wherein the first robotic machine is configured to perform the first sequence of sub-tasks by flying at least one of above or along a side of the vehicle, identifying the brake actuator of the vehicle, determining a position of the brake actuator relative to the vehicle, and providing a notification to the second robotic machine of the position of the brake actuator, and
  wherein the second robotic machine is configured to perform the second sequence of sub-tasks by moving on the ground to the vehicle proximate to the brake actuator responsive to the notification from the first robotic machine indicating that the brake actuator is in a non-actuated position, extending a robotic arm of the second robotic machine to the brake actuator, engaging and manipulating the brake actuator to move the brake actuator from the non-actuated position to an actuated position relative to the vehicle, releasing the brake actuator, and retracting the robotic arm.

2. The system of claim 1, wherein the second set of capabilities of the second robotic machine includes at least one capability that differs from the first set of capabilities of the first robotic machine.

3. The system of claim 1, wherein the task includes at least one of actuating a brake lever that represents the brake actuator to open a valve of an air brake system of the vehicle, setting or releasing a hand brake of the vehicle that represents the brake actuator, mechanically coupling or uncoupling the vehicle relative to another vehicle, or connecting or disconnecting an air hose of the vehicle relative to an air hose of another vehicle.

4. The system of claim 1, wherein the first and second robotic machines coordinate performance of the first sequence of sub-tasks by the first robotic machine with the performance of the second sequence of sub-tasks by the second robotic machine by communicating directly with each other.

5. The system of claim 4, wherein, responsive to completing a corresponding sub-task in the first sequence, the first robotic machine is configured to notify the second robotic machine that the corresponding sub-task is completed.

6. The system of claim 1, wherein at least some of the sub-tasks are sequential such that the second robotic machine is configured to begin performance of a corresponding sub-task in the second sequence responsive to receiving a notification from the first robotic machine that the first robotic machine has completed a specific sub-task in the first sequence.

7. The system of claim 1, wherein the first robotic machine is configured to perform at least one of the sub-tasks in the first sequence concurrently with performance of at least one of the sub-tasks in the second sequence by the second robotic machine.

8. The system of claim 1, wherein the task manager is configured to access a database that stores capability descriptions corresponding to each of the robotic machines in the group of robotic machines, the task manager configured to select the first and second robotic machines to perform the task instead of other robotic machines in the group based on a suitability of the capability descriptions of the first and second robotic machines to the task.

9. The system of claim 1, wherein the first robotic machine is configured to perform the first sequence of sub-tasks by lifting the second robotic machine from a starting location to a lifted location such that the second robotic machine in the lifted location is disposed more proximate to the brake actuator of the vehicle than when the second robotic machine is in the starting location, and, responsive to receiving a notification from the second robotic machine that manipulation of the brake actuator is complete, lowering the second robotic machine back to the starting location.

10. The system of claim 1, wherein the vehicle is a first vehicle of a vehicle system that includes multiple vehicles coupled together, the first robotic machine further configured to perform the first sequence of sub-tasks by extending a robotic arm of the first robotic machine and grasping an air hose of the first vehicle, the second robotic machine further configured to perform the second sequence of sub-tasks by extending the robotic arm of the second robotic machine to an air hose of a second vehicle adjacent to the first vehicle in the vehicle system and grasping the air hose, the robotic arms of the first and second robotic machines moving relative to one another with the corresponding air hoses to at least one of connect or disconnect the air hoses of the first and second vehicles.

11. A system comprising:
 a first robotic machine having a first set of capabilities for interacting with a surrounding environment, the first robotic machine configured to receive a first sequence of sub-tasks related to the first set of capabilities of the first robotic machine; and
 a second robotic machine having a second set of capabilities for interacting with the surrounding environment, the second robotic machine configured to receive a second sequence of sub-tasks related to the second set of capabilities of the second robotic machine,
 wherein the first and second robotic machines are configured to perform the first and second sequences of sub-tasks, respectively, to accomplish a task that involves at least one of manipulating or inspecting a brake actuator of a vehicle that is separate from the first and second robotic machines, the first and second robotic machines configured to coordinate performance of the first sequence of sub-tasks by the first robotic machine with performance of the second sequence of sub-tasks by the second robotic machine,
 wherein the first robotic machine is configured to perform the first sequence of sub-tasks by flying at least one of above or along a side of the vehicle, identifying the brake actuator of the vehicle, determining a position of the brake actuator relative to the vehicle, and providing a notification to the second robotic machine of the position of the brake actuator, and
 wherein the second robotic machine is configured to perform the second sequence of sub-tasks by moving on the ground to the vehicle proximate to the brake actuator responsive to the notification from the first robotic machine indicating that the brake actuator is in a non-actuated position, extending a robotic arm of the second robotic machine to the brake actuator, engaging and manipulating the brake actuator to move the brake actuator from the non-actuated position to an actuated position relative to the vehicle, releasing the brake actuator, and retracting the robotic arm.

12. The system of claim 11, wherein the second set of capabilities of the second robotic machine includes at least one capability that differs from the first set of capabilities of the first robotic machine.

13. The system of claim 11, wherein the task includes at least one of actuating a brake lever that represents the brake actuator to open a valve of an air brake system of the vehicle, setting or releasing a hand brake of the vehicle that represents the brake actuator, mechanically coupling or uncoupling the vehicle relative to another vehicle, or connecting or disconnecting an air hose of the vehicle relative to an air hose of another vehicle.

14. The system of claim 11, wherein at least some of the sub-tasks are sequential such that the second robotic machine is configured to begin performance of a corresponding sub-task in the second sequence responsive to receiving a notification from the first robotic machine that the first robotic machine has completed a specific sub-task in the first sequence.

15. The system of claim 11, wherein the first robotic machine is configured to perform the first sequence of sub-tasks by lifting the second robotic machine from a starting location to a lifted location such that the second robotic machine in the lifted location is disposed more proximate to the brake actuator of the vehicle than when the second robotic machine is in the starting location, and, responsive to receiving a notification from the second robotic machine that manipulation of the brake actuator is complete, lowering the second robotic machine back to the starting location.

16. A system comprising:
a first robotic machine having a set of capabilities for interacting with a surrounding environment, the first robotic machine having a communication circuit configured to receive a first sequence of sub-tasks for performing a task that involves at least one of manipulating or inspecting a brake actuator of a vehicle that is separate from the first robotic machine, the first sequence of sub-tasks related to the set of capabilities of the first robotic machine, the first robotic machine configured to perform the first sequence of sub-tasks, and to communicate with a second robotic machine during the performance of the first sequence of sub-tasks, the second robotic machine being separate from the vehicle and configured to perform a second sequence of sub-tasks for performing the task,
wherein the first robotic machine is configured to perform the first sequence of sub-tasks by flying at least one of above or along a side of the vehicle, identifying the brake actuator of the vehicle, determining a position of the brake actuator relative to the vehicle, and providing a notification to the second robotic machine of the position of the brake actuator,
wherein the second robotic machine is configured to perform the second sequence of sub-tasks by moving on the ground to the vehicle proximate to the brake actuator responsive to the notification from the first robotic machine indicating that the brake actuator is in a non-actuated position, extending a robotic arm of the second robotic machine to the brake actuator, engaging and manipulating the brake actuator to move the brake actuator from the non-actuated position to an actuated position relative to the vehicle, releasing the brake actuator, and retracting the robotic arm, and
wherein completion of both the first and second sequences of sub-tasks accomplishes the task.

17. The system of claim 16, wherein the first robotic machine is configured to communicate with the second robotic machine during the performance of the first sequence of sub-tasks to coordinate with the second robotic machine such that the first robotic machine starts a corresponding sub-task in the first sequence responsive to a received notification from the second robotic machine that the second robotic machine has at least one of started or completed a specific sub-task in the second sequence.

18. The system of claim 16, wherein, responsive to completing a corresponding sub-task in the first sequence, the first robotic machine is configured to transmit a notification to the second robotic machine that the corresponding sub-task is completed.

19. The system of claim 16, wherein the robotic arm of the second robotic machine is configured to engage the brake actuator by grasping the brake actuator.

* * * * *